United States Patent [19]
Cho

[11] Patent Number: 5,335,087
[45] Date of Patent: Aug. 2, 1994

[54] DOCUMENT ACKNOWLEDGE SYSTEM HAVING HORIZONTAL/VERTICAL-RUN LENGTH SMOOTHING ALGORITHM CIRCUITS AND A DOCUMENT REGION DIVIDE CIRCUIT

[75] Inventor: Mun H. Cho, Kyungki-Do, Rep. of Korea

[73] Assignee: Goldstar Co., Ltd., Seoul, Rep. of Korea

[21] Appl. No.: 135,469

[22] Filed: Oct. 13, 1993

Related U.S. Application Data

[62] Division of Ser. No. 678,051, Apr. 1, 1991, Pat. No. 5,282,056.

[30] Foreign Application Priority Data

Mar. 31, 1990 [KR] Rep. of Korea ............... 4443/1990
Aug. 27, 1990 [KR] Rep. of Korea ............. 13246/1990

[51] Int. Cl.$^5$ ............................................. H04N 3/14
[52] U.S. Cl. ................................. 358/432; 358/406
[58] Field of Search ............... 358/432, 406, 426, 433, 358/444, 261.1–261.3

[56] References Cited

U.S. PATENT DOCUMENTS

| | | | |
|---|---|---|---|
| 4,524,395 | 6/1955 | Banton | 358/474 |
| 4,590,606 | 5/1986 | Rohrer | 358/406 |
| 4,809,081 | 2/1989 | Linehan | 358/432 |
| 4,947,267 | 8/1990 | Maraki et al. | 358/464 |

Primary Examiner—Stephen Brinich

[57] ABSTRACT

A document acknowledge system comprising horizontal/vertical-run length smoothing algorithm circuits in which a horizontal-run length smoothing algorithm (H-RLSA) and a vertical-run length smoothing algorithm (V-RLSA) are performed by hardware and a document region divide circuit for dividing a document region in which the smoothed data is logical-produced by hardware. Therefore, the horizontal-run length smoothing algorithm circuit can smooth horizontal data not with software executed by a microprocessor, but with hardware, the horizontal data stored by scanning a document horizontally. Also, the vertical-run length smoothing algorithm circuit can smooth vertical data not with software executed by a microprocessor, but with hardware, the vertical data stored by scanning the document vertically. Moreover, the document region divide circuit can divide a document region in which the smoothed data is logical-produced by hardware.

22 Claims, 6 Drawing Sheets

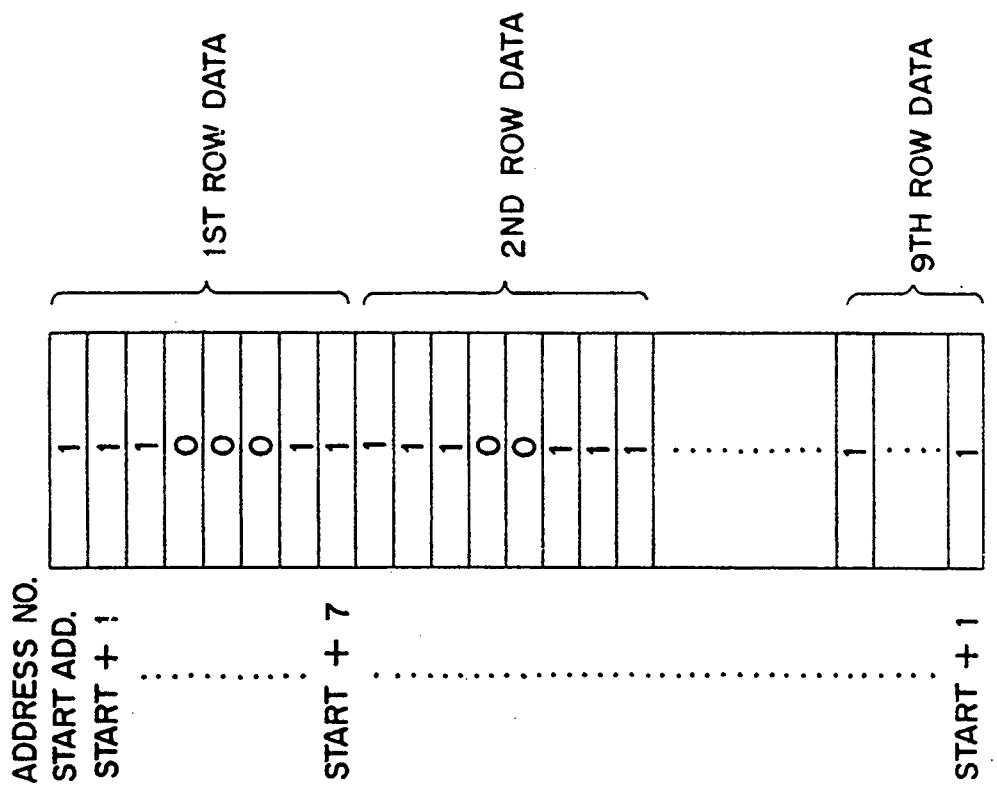

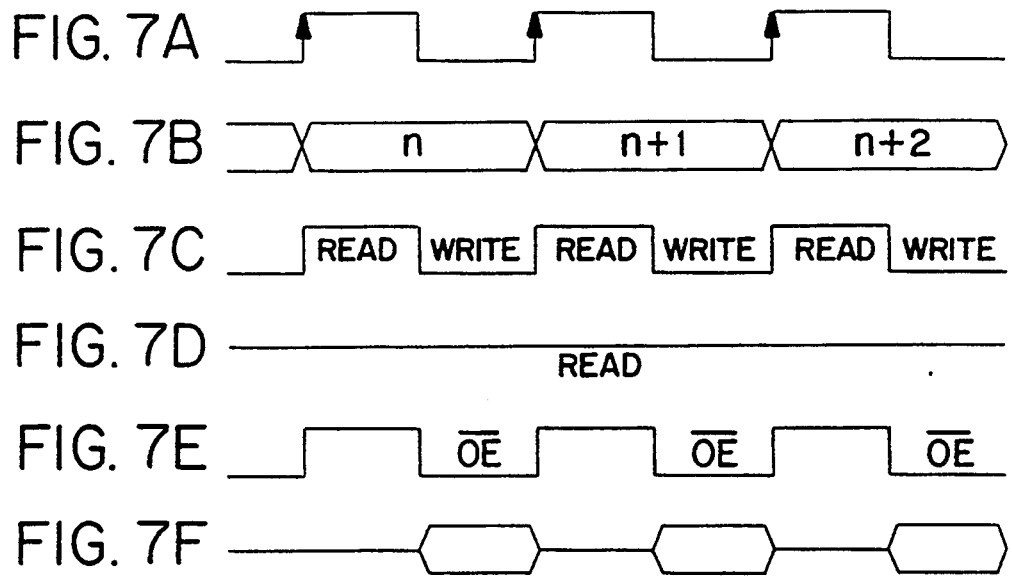

DOCUMENT ACKNOWLEDGE SYSTEM HAVING HORIZONTAL/VERTICAL-RUN LENGTH SMOOTHING ALGORITHM CIRCUITS AND A DOCUMENT REGION DIVIDE CIRCUIT

This application is a divisional of copending application Ser. No. 07/678,051, filed on Apr. 1, 1991, now U.S. Pat. No. 5,282,056, issued, Jan. 25, 1994, the entire contents of which are hereby incorporated by reference.

BACKGROUND OF THE INVENTION

The present invention relates to a document acknowledge system, more particularly, to horizontal/vertical-run length smoothing algorithm circuits in which a horizontal-run length smoothing algorithm (H-RLSA) and a vertical run length smoothing algorithm (V-RLSA) are performed by hardware and a document region divide circuit for dividing a document region in which the smoothed data is logical-produced by hardware.

Conventionally, the document acknowledge system scans a document horizontally to store horizontal data, and then scans the document vertically to store vertical data. Then, the system performs a horizontal-run length smoothing algorithm process. By this process, while only binary data "1" succeeded above a predetermined number of times is maintained naturally, binary data "1" not succeeded above the predetermined number of times is canceled. For example, provided that the system scans the document, so that it stores the horizontal data "0001111000111111", and a threshold value is "5", the smoothed data "0000000000111111" is obtained, since only binary data "1" succeeded above 5 times is maintained naturally and binary data "1" not succeeded above 5 times is reset into binary data "0"by the horizontal-run length smoothing algorithm process.

Then, the document acknowledge system performs a vertical-run length smoothing algorithm process. Similarly, by this process, while only binary data "1" succeeded above a predetermined number of times is maintained naturally, binary data "1" not succeeded above the predetermined number of times is canceled. The smoothed data obtained from these processes then are divided by block unit. These divided results allow the document text and graphic region to be divided in accordance with height and width of the block.

However, in the above-mentioned coventional document acknowledge system, the horizontal-run length smoothing algorithm and vertical-run length smoothing algorithm are processed by software executed by a microprocessor and the smoothed data also is logical-produced by the software. Thus, the microprocessor in the system can be loaded with too much works, causing its efficiency to be reduced and its process to be run slowly.

SUMMARY OF THE INVENTION

Therefore, an object of the present invention is to provide a horizontal-run length smoothing algorithm circuit for smoothing horizontal data not with software executed by a microprocessor, but with hardware, the horizontal data stored by scanning a document horizontally.

Another object of the present invention is to provide a vertical-run length smoothing algorithm circuit for smoothing vertical data not with software executed by a microprocessor, but with hardware, the vertical data stored by scanning the document vertically.

Still another object of the present invention is to provide a document region divide circuit for dividing a document region in which the smoothed data is logical-produced by hardware.

In accordance with the present invention, these objects can be accomplished by providing a document acknowledge system comprising: a horizontal-run length smoothing algorithm circuit comprising an address generating counter for counting a system clock signal $\phi_1$ to output the counted value as an address signal, a horizontal-run length smoothing algorithm (H-RLSA) memory for storing horizontal data and inputting the address signal from the address generating counter, a count control unit for applying the system clock signal $\phi_1$ as a count clock signal and applying low voltage data to the H-RLSA memory, at write state of the H-RLSA memory and for comparating read data with a reference signal B+ to apply the system clock signal $\phi_1$ as the count clock signal when the read data and the reference signal B+ are the same and to output a comparison enable signal at initial state of the period that the read data and the reference signal B+ are not the same, at read state of the H-RLSA memory, a read/write control unit for counting up/down the system clock signal $\phi_1$ outputted from the count control unit in accordance with the read/write states of the H-RLSA memory and comparating the counted value with a horizontal threshold value in response to the comparison enable signal when the comparison enable signal is outputted from the count control unit to output read/write control signals in response to the comparated results, and a write address setting unit for subtracting the counted value from the read/write control unit from the output address value from the address generating counter and then loading the subtracted value into the address generating counter, at initial state of period that the write control signal is outputted from the read/write control unit;

a vertical-run length smoothing algorithm circuit comprising a start address setting unit for storing number of horizontal pixels as an offset value and number of vertical pixels, generating a carry signal as many as the number of vertical pixels whenever the read operation is completed, loading with and outputting a start address value, and incrementing the start address value whenever the carry signal is generated to output the next vertical column of the start address value, a system clock supplying unit for supplying a system clock signal $\phi_1$ until the carry signal is generated as much as the offset value after the start address value is outputted from the start address setting unit, an address generating counter responsive to the system clock signal $\phi_1$ for loading with the start address value from the start address setting unit and outputting an address signal, a vertical-run length smoothing algorithm (V-RLSA) memory for storing vertical data and inputting the address signal from the address generating counter, resulting in being accessed, a count control unit for applying the system clock signal $\phi_1$ as a count clock signal and applying low voltage data to the V-RLSA memory, at write state of the V-RLSA memory and for comparating read data with a reference signal B+ to apply the system clock signal $\phi_1$ as the count clock signal when the read data and the reference signal B+ are the same and the output a comparison enable signal at initial state of the period that the read data and the reference signal B+ are not the same, at read state of the V-RLSA memory, a read/write control unit for counting up/down the system clock signal $\phi_1$ outputted from the count control unit in accordance with the read/write states of the V-RLSA memory and comparating the counted value with a horizontal threshold value in response to the comparison enable signal when the comparison enable signal is outputted from the count control unit to output read/write control signals in response to the comparated results, and an address resetting unit for adding the offset value from the start address setting unit to the address signal value from the address generating counter and then loading the added value into the address generating counter in response to the system clock signal $\phi_1$, multiplying the offset value from the start address setting unit by the counted value from the read/write control unit and then subtracting the multiplied value from the address signal value from the address generating counter, and loading the remaining value into the address generating counter at initial state of the period that the write control signal is outputted from the read/write control unit; and a document region divide circuit comprising a horizontal-run length smoothing algorithm (H-RLSA) circuit, a vertical-run length smoothing algorithm (V-RLSA) circuit, a system clock and address supplying unit for supplying a system clock signal $\phi_1$ in response to an end signal ES of the V-RLSA circuit, counting the system clock signal $\phi_1$ to output the counted value as horizontal/vertical address signals, and stopping supplying the system clock signal $\phi_1$ when the system clock signal $\phi_1$ was outputted therefrom a predetermined number of times, an address and read/write selecting unit responsive to the end signal ES of the V-RLSA circuit for selecting any one of the horizontal address signal of the H-RLSA circuit, the vertical address signal of the V-RLSA circuit and the counted value from the system clock and address supplying unit to output the selected signal as horizontal/vertical address signals, selecting one of horizontal read/write control signals R/W of the H-RLSA circuit and the system clock signal $\phi_1$ to output the selected signal as the horizontal read/write control signals, and selecting one of vertical read/write control signals R/W of the V-RLSA circuit and the end signal ES of the V-RLSA circuit to output the selected signal as the vertical read/write control signals, a horizontal-run length smoothing algorithm (H-RLSA) memory accessed by the horizontal address signal from the address and read/write selecting unit and responsive to the horizontal read/write control signals for operating at read/write states, a vertical-run length smoothing algorithm (V-RLSA) memory accessed by the vertical address signal from the address and read/write selecting unit operating at read/write states, an AND gate for ANDing output data from the H-RLSA memory and V-RLSA memory by bit unit, and a buffer for allowing an output signal from the AND gate to be passed therethrough during a half cycle of the system clock signal $\phi_1$ to apply the output signal from the AND gate as write data to the H-RLSA memory.

BRIEF DESCRIPTION OF THE DRAWINGS

The above and other objects, features and advantages of the present invention will be more clearly understood from the following detailed description taken in conjunction with the accompanying drawings, in which:

FIGS. 3A and 3B illustrate tables of the original pixel data and the smoothed pixel data by the present invention, respectively;

FIG. 4 illustrates a map of a V-RLSA memory shown in FIG. 2;

FIGS. 7A to 7F are waveform diagrams of respective outputs from components of the circuit shown in FIG. 6; and FIGS. 8A to 8C illustrate the pixel data of a H-RLSA memory and the V-RLSA memory of the circuit shown in FIG. 6 and the ANDed data of pixel data of the H-RLSA memory and the V-RLSA memory, respectively.

DETAILED DESCRIPTION OF PREFERRED EMBODIMENTS

Figure 1:
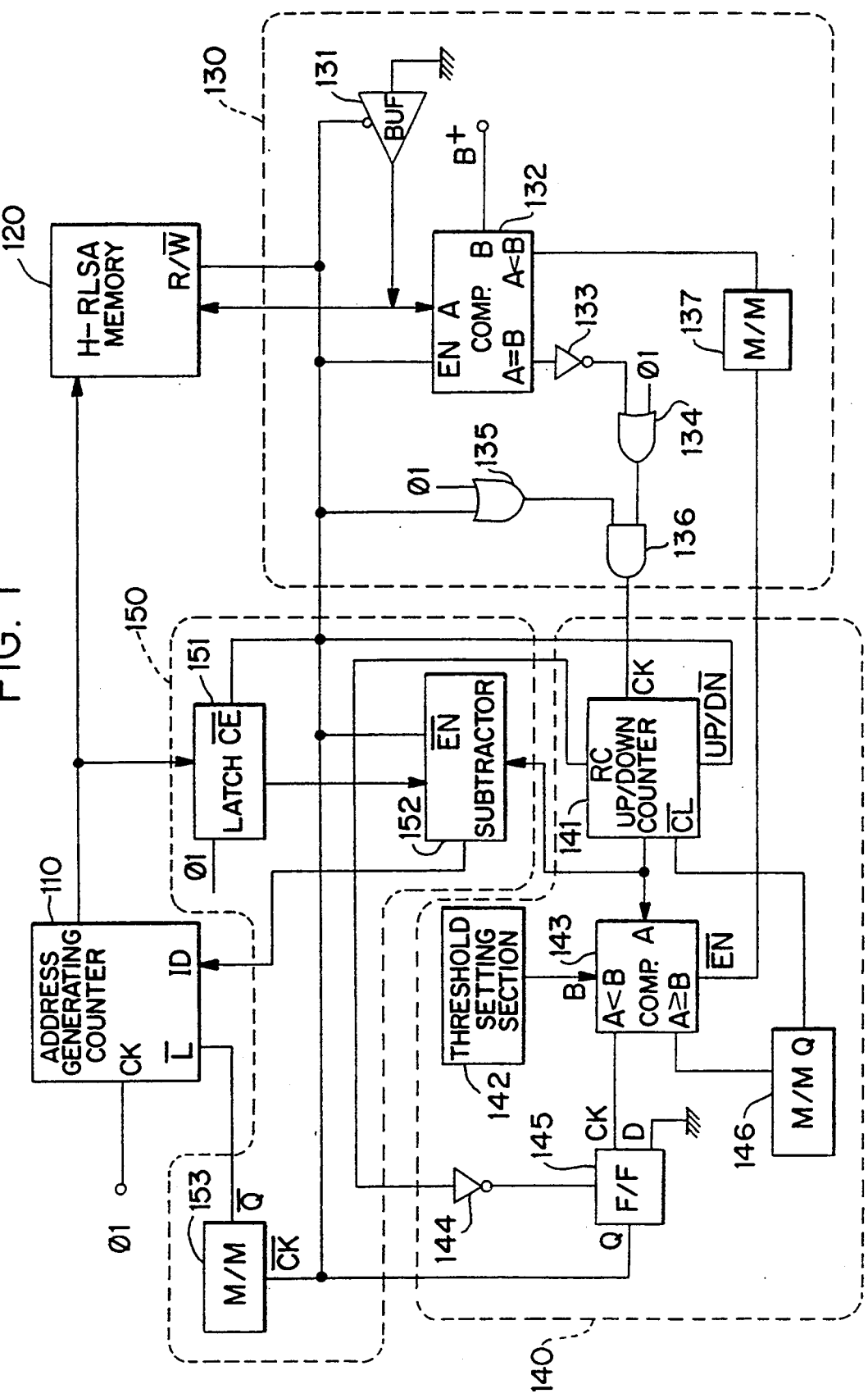
Fig. 1 is a block diagram of a horizontal-run length smoothing algorithm circuit of the present invention.

FIG. 1 is a block diagram of a horizontal-run length smoothing algorithm circuit of the present invention. As shown in the drawing, the horizontal-run length smoothing algorithm circuit comprises an address generating counter 110 for counting a system clock signal $\phi_1$ to output the counted value as an address signal, a horizontal-run length smoothing algorithm (H-RLSA) memory 120 for storing horizontal data and inputting the address signal from the address generating counter 110, a count control unit 130 for applying the system clock signal $\phi_1$ as a count clock signal and applying low voltage data to the H-RLSA memory 120, at write state of the H-RLSA memory 120 and for comparing read data with a reference signal B+ to apply the system clock signal $\phi_1$ as the count clock signal when the read data and the reference signal B+ are the same and to output a comparison enable signal at initial state of the period that the read data and the reference signal B+ are not the same, at read state of the H-RLSA memory 120, a read/write control unit 140 for counting up/down the system clock signal $\phi_1$ outputted from the count control unit 130 in accordance with the read/write states of the H-RLSA memory 120 and comparating the counted value with a horizontal threshold value when the comparison enable signal is outputted from the count control unit 130 to output read/write control signals in response to the comparated results, and a write address setting unit 150 for substracting the counted value from the read/write control unit 140 from the output address value from the address generating counter 110 and then loading the subtracted value into the address generating counter 110, at initial state of period that the write control signal is outputted from the read/write control unit 140.

The count control unit 130 comprises a buffer 131 for applying low voltage data to the H-RLSA memory 120 at write state of the H-RLSA memory 120, a comparator 132 for comparating the read data with the reference signal B+ at read state of the H-RLSA memory 120, an inverter 133 for inverting an output signal from one output terminal (A=B) of the comparator 132, an OR gate 134 for ORing an output signal from the inverter 133 and the system clock signal $\phi_1$, an OR gate 135 for ORing the read/write control signals from the read/write control unit 140 to the H-RLSA memory 120 and the system clock signal $\phi_1$, an AND gate 136 for ANDing output signals from the OR gates 134 and 135 to apply the ANDed signal as the count clock signal, and a mono-multivibrator 137 responsive to a output signal from the other terminal (A<B) of the comparator 132 for outputting the comparison enable pulse signal.

Also, the read/write control unit 140 comprises an up/down counter 141 for counting up/down the system clock signal $\phi_1$ outputted from the count control unit 130 in accordance with the read/write states of the H-RLSA memory 120, a threshold setting unit 142 for setting the horizontal threshold value, a comparator 143 for comparing the counted value from the up/down counter 141 with the horizontal threshold value from the threshold setting unit 142 when the comparison enable signal is outputted from the count control unit 130, an inverter 144 for inverting a carry signal from the up/down counter 141, a flip-flop 145 responsive to an output signal from the inverter 144 for outputting the read control signal and responsive to an output signal from one output terminal (A<B) of the comparator 143 for outputting the write control signal, and mono-multivibrator 146 responsive to an output signal from the other terminal (A>B) of the comparator 143 for generating a pulse signal to apply the pulse signal as a clear signal to the up/down counter 141.

Also, the write address setting unit 150 comprises a latch 151 responsive to the write control signal from the read/write control unit 140 for latching the address signal from the address generating counter 110, a subtracter 152 responsive to the write control signal from the read/write control unit 140 for subtracting the counted value from the read/write control unit 140 from an output signal from the latch 151 to apply the subtracted value as load data to the address generating counter 110, and a mono-multivibrator 153 responsive to the write control signal from the read/write control unit 140 for generating a pulse signal to apply the pulse signal as a load control signal to the address generating count 110.

Figure 2:
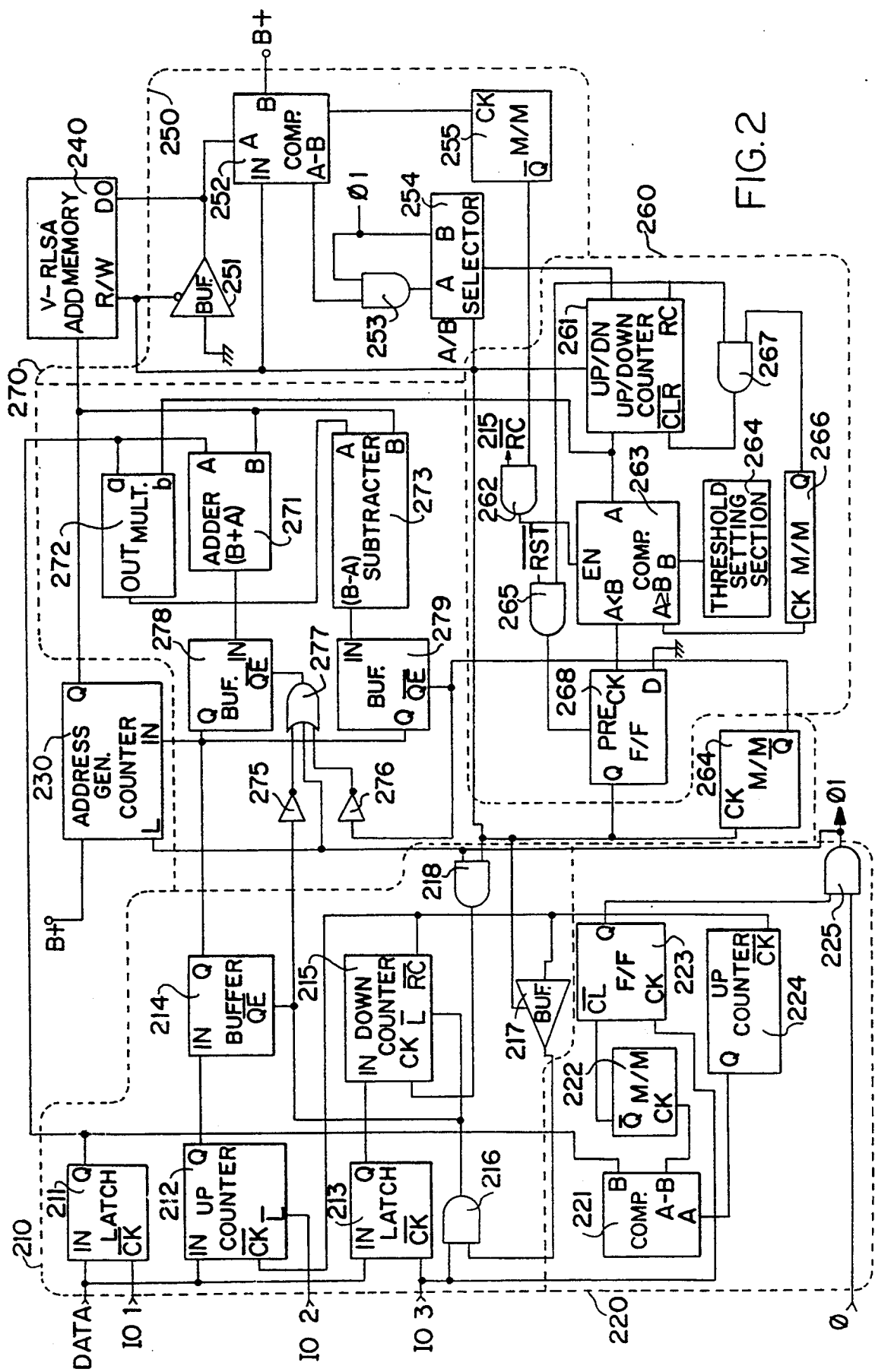
FIG. 2 is a block diagram of a vertical-run length smoothing algorithm circuit of the present invention.

FIG. 2 is a block diagram of a vertical-run length smoothing algorithm circuit of the present invention. As shown in the drawing, the vertical-run length smoothing algorithm circuit comprises a start address setting unit 210 for storing number of horizontal pixels as an offset value and number of vertical pixels, generating a carry signal as many as the number of vertical pixels whenever the read operation is completed, loading with and outputting a start address value, and incrementing the start address value whenever the carry signal is generated to output the next vertical column of the start address value, a system clock supplying unit 220 for supplying a system clock signal $\phi_1$ until the carry signal is generated as much as the offset value after the start address value is outputted from the start address setting unit 210, an address generating counter 230 responsive to the system clock signal $\phi_1$ for loading with the start address value from the start address setting unit 210 and outputting an address signal, a vertical-run length smoothing algorithm (V-RLSA) memory 240 for storing vertical data and inputting the address signal from the address generating counter 230, resulting in being accessed, a count control unit 250 for applying the system clock signal $\phi_1$ as a count clock signal and applying low voltage data to the V-RLSA memory 240, at write state of the V-RLSA memory 240 and for comparating read data with a reference signal B+ to apply the system clock signal $\phi_1$ as the count clock signal when the read data and the reference signal B+ are the same and to output a comparison enable signal at initial state of the period that the read data and the reference signal B+ are not the same, at read state of the V-RLSA memory 240, a read/write control unit 260 for counting up/down the system clock signal $\phi_1$ outputted from the count control unit 250 in accordance with the read/write states of the V/RLSA memory 240 and comparing the counted value with a horizontal threshold value when the comparison enable signal is outputted from the count control unit 250 to output read/write control signals in response to the comparated results, and an address resetting unit 270 for adding the offset value from the start address setting unit 210 to the address signal value from the address generating counter 230 counter 230 in response to the system clock signal $\phi_1$, multiplying the offset value from the start address setting unit 210 by the counted value from the read/write control unit 260 and then subtracting the multiplied value from the address signal value from the address generating counter 230, and loading the remaining value into the address generating counter 230 at initial state of the period that the write control signal is outputted from the read/write control unit 260.

The start address setting unit 210 comprises a latch 211 responsive to a horizontal control signal $IO_1$ for latching the number of horizontal pixels as the offset value, a latch 213 responsive to a vertical control signal $IO_3$ for latching the number of vertical pixels, an AND gate 218 responsive to the read control signal from the read/write control unit 260 for allowing the system clock signal $\phi_1$ to be passed therethrough, a down counter 215 for inputting an output signal from the latch 213 as a load signal and counting down an output signal from the AND gate 218 to generate the carry signal, a buffer 217 responsive to the read control signal from the read/write control unit 260 for allowing the carry signal from the down counter 215 to be passed therethrough, an AND gate 216 for ANDing output signal from the buffer 217 and the vertical control signal $IO_3$ to apply the ANDed signal as a load control signal to the down counter 215, an up counter 212 for loading with the start address value in response to a start control signal $IO_2$ and counting up the carry signal from the down counter 215, and a buffer 214 responsive to an output signal from the AND gate 216 for allowing an output signal from the up counter 212 to be passed therethrough.

Also, the system clock supplying unit 220 comprises a flip-flop 223 for inputting the vertical control signal $IO_3$ as a clock signal to output a high voltage signal, an AND gate 225 for ANDing the high voltage signal from the flip-flop 223 and a reference clock signal $\phi$ to output the ANDed signal as the system clock signal $\phi_1$, an up counter 224 for counting up the carry signal from the start address setting unit 210, a comparator 221 for comparing the counted value from the up counter 224 with the offset value from the start address setting unit 210, and a mono-multivibrator 222 responsive to an output signal from the terminal (A=B) of the comparator 221 for generating a pulse signal to apply the pulse signal as a clear signal to the flip-flop 223.

Also, the count control unit 250 comprises a buffer 251 for applying low voltage data to the V-RLSA memory 240 at write state of the V-RLSA memory 240, a comparator 252 for comparing the read data with the reference signal B+ at read state of the V-RLSA memory 240, an AND gate 253 for ANDing the output signal from the one output terminal (A=B) of the comparator 252 and the system clock signal $\phi_1$, a selector 254 for selecting one of an output signal from the AND gate 253 and the system clock signal $\phi_1$ in accordance with the read/write states of the V-RLSA memory 240 to apply the selected signal as the count clock signal, and a mono-multivibrator 255 responsive to an output signal from the other terminal (A<B) of the comparator 252 for generating a pulse signal to apply the pulse signal as the comparison enable signal.

The read/write control unit 260 comprises an up/down counter 261 for counting up/down the system clock signal $\phi_1$ outputted from the count control unit 250 in accordance with the read/write states of the V-RLSA memory 240, a threshold setting unit 264 for setting the vertical threshold value, an AND gate 262 for ANDing the comparison enable signal from the count control unit 250 and the carry signal from the start address setting unit 210, a comparator 263 enabled by an output signal from the AND gate 262 for comparating the counted value from the up/down counter 261 with the vertical threshold value from the threshold setting unit 264, a mono-multivibrator 266 responsive to an output signal from one output terminal (A≧B) of the comparator 263 for outputting a pulse signal, AND gate 267 for ANDing the pulse signal from the mono-multivibrator 266 and the carry signal from the updown counter 261 to apply the ANDed signal as a clear signal to the updown counter 261, an AND gate 265 for ANDing the carry signal from the up/down counter 261 and a reset signal RST, and a flip-flop 268 responsive to an output signal from the AND gate 265 for outputting the read control signal and responsive to an output signal from the other output terminal (A<B) of the comparator 263 for outputting the write control signal.

Also, the address resetting unit 270 comprises an adder 271 for adding the offset value from the start address setting unit 210 to the address signal value from the address generating counter 230, a multiplier 272 for multiplying the offset value by the counted value from the read/write control unit 260, a subtracter 273 for subtracting an output signal value of the multiplier 272 from the address signal value of the address generating counter 230, a mono-multivibrator 274 responsive to the write control signal from the read/write control unit 260 for generating a pulse signal, an inverter 275 for inverting an output enable signal from the start address setting unit 210, an inverter 276 for inverting the pulse signal from the mono-multivibrator 274, an OR gate 277 for ORing output signals from the inverters 275 and 276 and the system clock signal $\phi_1$, a buffer 278 responsive to an output signal from the OR gate 277 for allowing an output signal from the adder 271 to be passed therethrough to apply the output signal from the adder 271 as a load signal to the address generating counter 230, and a buffer 279 responsive to the pulse signal from the mono-multivibrator 274 for allowing an output signal from the subtracter 273 to be passed therethrough to apply the output signal from the subtracter 273 as a load signal to the address generating counter 230.

FIGS. 3A and 3B illustrate tables of the original pixel data of the V-RLSA memory 240 and the smoothed pixel data by the present invention in the case that the vertical threshold value is 3, respectively.

Figure 5:
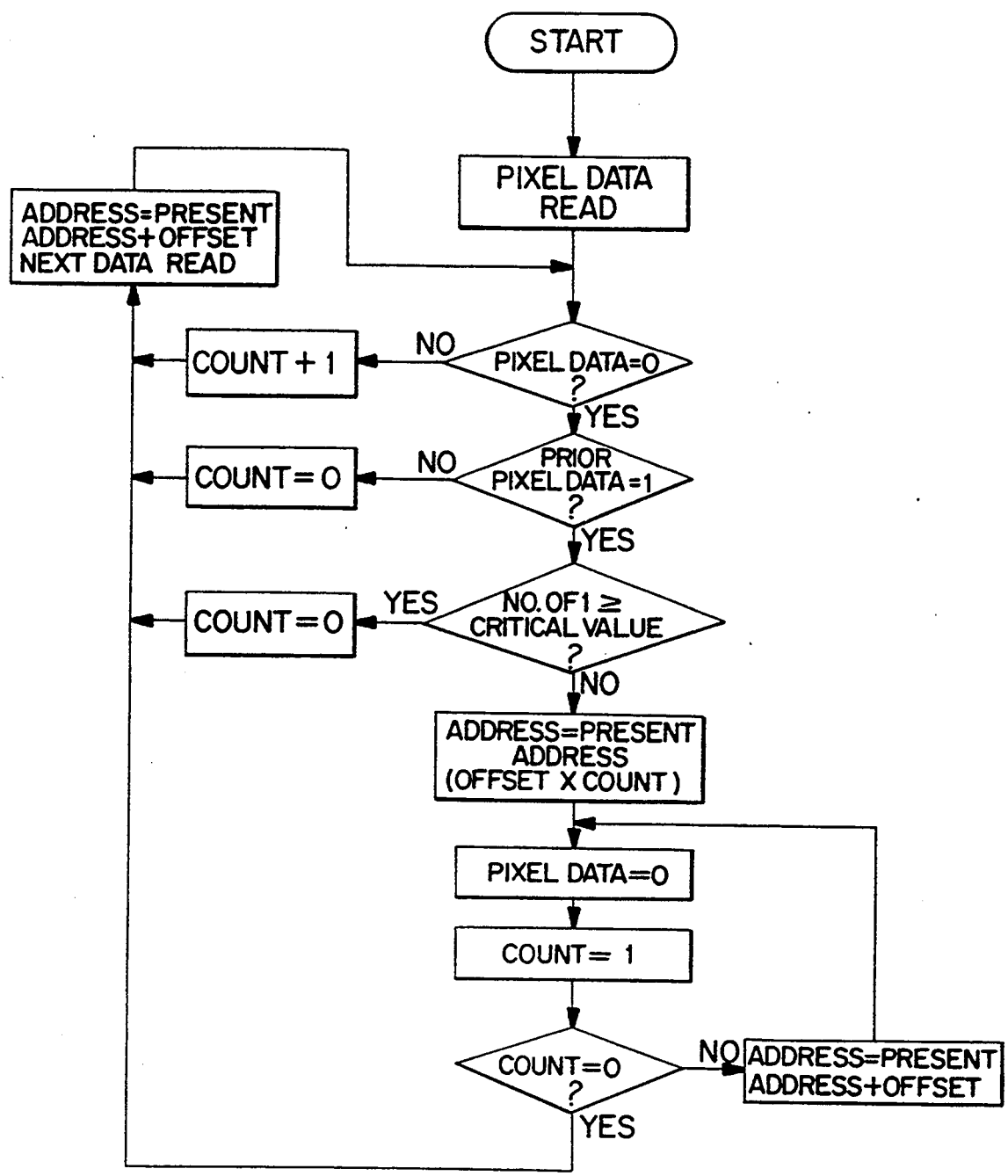
FIG. 5 is a flowchart of operation of the circuit shown in FIG. 2.

FIG. 4 illustrates a map of a V-RLSA memory 240 shown in FIG. 2 and FIG. 5 is a flowchart of operation of the vertical-run length smoothing algorithm circuit shown in FIG. 2.

Figure 6:
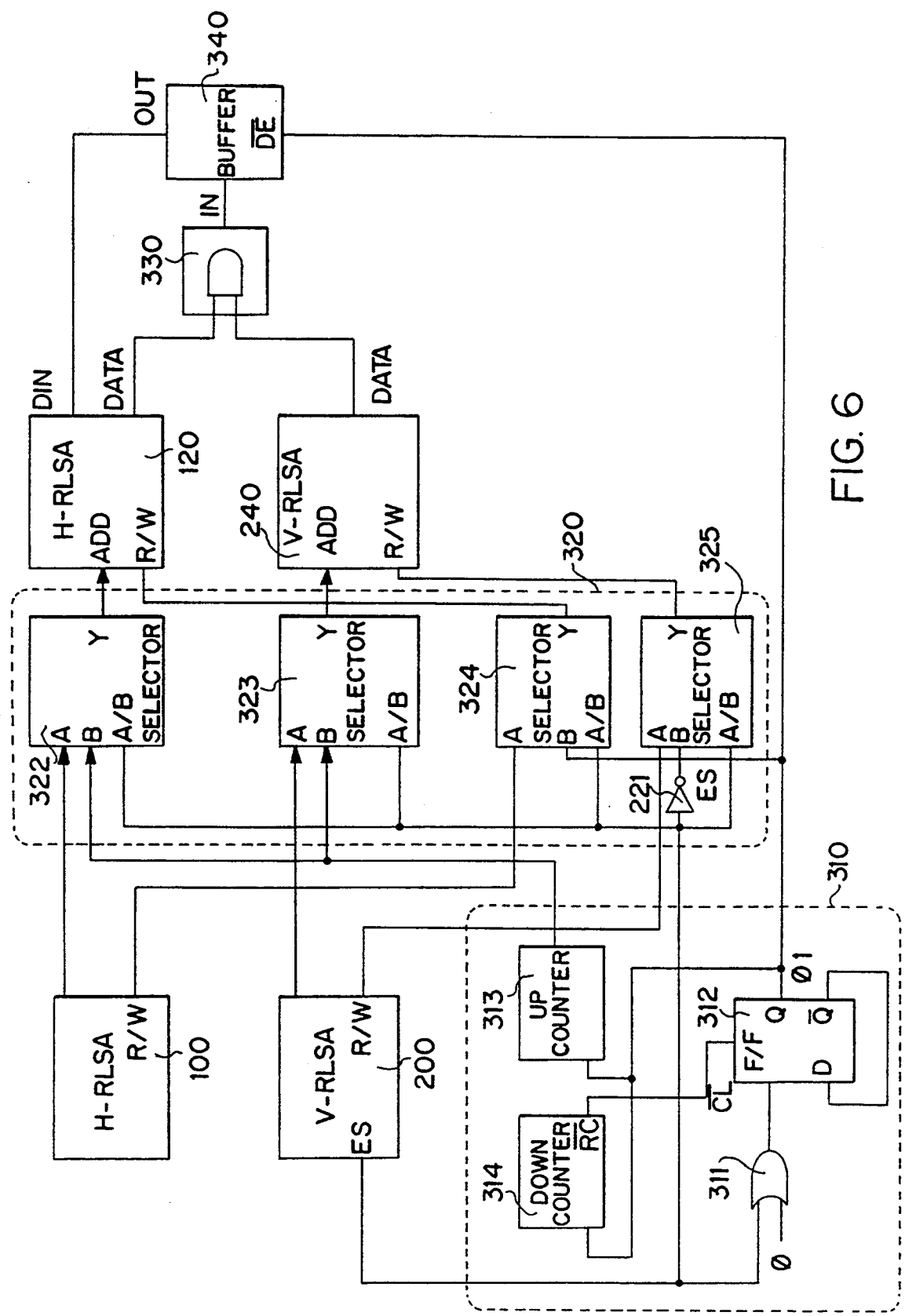
FIG. 6 is a block diagram of a document region divide circuit of the present invention.

FIG. 6 is a block diagram of a document region divide circuit of the present invention. As shown in the drawing, the document region divide circuit comprises a horizontal-run length smoothing algorithm (H-RLSA) circuit 100, a vertical-run length smoothing algorithm (V-RLSA) circuit 200, a system clock and address supplying unit 310 for supplying a system clock signal $\phi_1$ in response to an end signal ES of the V-RLSA circuit 200, counting the system clock signal $\phi_1$ to output the counted value as horizontal/vertical address signals, and stopping supplying the system clock signal $\phi_1$ when the system clock signal $\phi_1$ was outputted therefrom a predetermined number of times, an address and read/write selecting unit 320 responsive to the end signal ES of the V-RLSA circuit 200 for selecting any one of the horizontal address signal of the H-RLSA circuit 100, the vertical address signal of the V-RLSA circuit 200 and the counted value from the system clock and address supplying unit 310 to output the selected signal as horizontal/vertical address signals, selecting one of horizontal read/write control signals R/W of the H-RLSA circuit 100 and the system clock signal $\phi_1$ to output the selected signal as the horizontal read/write control signals, and selecting one of vertical read/write control signals R/W of the V-RLSA circuit 200 and the end signal ES of the V-RLSA circuit 200 to output the selected signal as the vertical read/write control signals, a horizontal-run length smoothing algorithm (H-RLSA) memory 120 accessed by the horizontal address signal from the address and read/write selecting unit 320 and responsive to the horizontal read/write control signals for operating at read/write states, a vertical-run length smoothing algorithm (V-RLSA) memory 240 accessed by the vertical address signal from the address and read/write selecting unit 320 and responsive to the vertical read/write control signals for operating at read/write states, an AND gate 330 for ANDing output data from the H-RLSA memory 120 and V-RLSA memory 240 by bit unit, and a buffer 340 for allowing an output signal from the AND gate 330 to be passed therethrough during a half cycle of the system clock signal $\phi_1$ to apply the output signal from the AND gate 330 as write data to the H-RLSA memory 120.

The system clock and address supplying unit 310 comprises an OR gate 311 for ORing the end signal ES of the V-RLSA circuit 200 and a reference clock signal $\phi$, a flip-flop 312 for inputting an output signal from the OR gate 311 as a clock signal to output the output signal from the OR gate 311 as the system clock signal $\phi_1$, an up counter 313 for counting up the system clock signal $\phi_1$, to output the counted value as the horizontal/vertical address signals, and a down counter for counting down the system clock signal $\phi_1$, a predetermined number of times to generate a carry signal to apply the carry signal as a clear signal to the flip-flop 312.

Also, the address and read/write selecting unit 320 comprises an inverter 312 for inverting the end signal ES of the V-RLSA circuit 200, a selector 322 responsive to the end signal ES of the V-RLSA circuit 200 for selecting one of the horizontal address signal of the H-RLSA circuit 100 and counted value from the system clock and address supplying unit 310 to output the selected signal as the horizontal address signal, a selector 323 responsive to the end signal ES of the V-RLSA circuit 200 for selecting one of the vertical address signal of the V-RLSA circuit 200 and the counted value from the system clock and address supplying unit 310 to output the selected signal as vertical address signal, a selector 324 responsive to the end signal ES of the V-RLSA circuit 200 for selecting one of horizontal read/write control signals R/W of the H-RLSA circuit 100 and the system clock signal $\phi_1$ to output the selected signal as the horizontal read/write control signals, and a selector responsive to the end signal ES of the V-RLSA circuit 200 for selecting one of vertical read/write control signals R/W of the V-RLSA circuit 200 and an output signal of the inverter 321 to output the selected signal as the vertical read/write control signals.

FIGS. 7A to 7F are waveform diagrams of respective outputs from components of the document region divide circuit shown in FIG. 6; and FIGS. 8A to 8C illustrate the pixel data of the H-RLSA memory 120 and the V-RLSA memory 240 of the document region divide circuit shown in FIG. 6 and the ANDed data of pixel data of the H-RLSA memory 120 and the V-RLSA memory 240, respectively.

Now, operations of the horizontal/vertical-run length smoothing algorithm circuit and the document region divide circuit in accordance with the present invention will be described more detailed.

In operation, at initial state of powering on, the up/down counter 141 indicated in FIG. 1 generates at the carry terminal (RC) a carry signal of high voltage which is in turn inverted by the inverter 144 into a low voltage signal, and then applied as a present signal to the flip-flop 145. Therefore, the flip-flop 145 outputs a read control signal of high voltage, thus the H-RLSA memory 120 enters a read state, simultaneously the buffer 131 enters a cut-off state. Also, the comparator 132 enters an enable state, simultaneously the latch 151 and the subtracter 152 enter disable states, so that the mono-multivibrator 153 can not output any pulse signal. In this case, the up/down counter 141 functions as an up counter.

Accordingly, the address generating counter 110 counts the system clock signal $\phi_1$ in order to address the locations of the H-RLSA memory 120, sequentially. Also, the data stored in the addressed location of the H-RLSA memory 120 is read out, the read out data is in turn applied to the input terminal A of the comparator 132 in order to be compared with the reference signal B+ applied to the other input terminal (B). At this time, if the data applied to the input terminal (A) of the comparator 132 is the same high voltage data as that of the reference signal B+, a low voltage signal is outputted from the output terminal (A<B) of the comparator 132, also a high voltage signal is outputted from the other output terminal (A=B) thereof. The high voltage signal outputted from the output terminal (A=B) is inverted by the inverter 133 into a low voltage signal which is in turn applied to an input terminal of the OR gate 134, so that the system clock signal $\phi_1$ is applied to an input terminal of the AND gate 136 through the OR gate 134. At this time, a high voltage signal outputted from the flip-flop 145 is also applied to the other input terminal of the AND gate 136 through the OR gate 135, so that the system clock signal $\phi_1$ is applied as a count clock signal to the up/down counter 141 through the AND gate 136. Accordingly, the up/down counter 141 counts up the system clock signal $\phi_1$.

As above described, the address generating counter 110 counts the system clock signal $\phi_1$ in order to sequentially address the locations of the H-RLSA memory 120, and then if the data stored in the addressed location of the H-RLSA memory 120 is the same high voltage data as that of the reference signal B+, the up/down counter 141 counts up the system clock signal $\phi_1$. It is therefore known that the up/down counter 141 counts up the times of the data of high voltage read out from the H-RLSA memory 120.

On the other hand, if the data stored in the addressed location of the H-RLSA memory 120 is a low voltage data different from the reference signal B+, the output signals from the comparator 132 are inverted so that the low voltage signal is outputted from the other output terminal (A=B) and the high voltage signal is outputted from the output terminal (A<B). Also, at initial output state of the high voltage signal from the output terminal (A<B), a low voltage pulse signal is outputted from the mono-multivibrator 137 which is in turn applied to the comparator 143 as a comparison enable signal. Thereafter, the comparator 143 compares the counted value from the up/down counter 141 with the horizontal threshold value from the threshold setting unit 142, and then outputs the comparing result signal at its output terminal (A<B). For example, if the threshold value is "3", and the counted value from the up/down counter 141 exceeds "3", the comparator 143 outputs a low voltage signal at its output terminal (A<B), and a high voltage signal at its other output terminal (A≧B). In initial output state of the high voltage signal from the output terminal (A≧B), a low voltage pulse signal is outputted from the mono-multivibrator 146 in order to clear the up/down counter 141, so that the counted value of "0" can be obtained from the counter 141, also the carry signal is outputted.

If the data read out from the H-RLSA memory 120 is a low voltage data different from that of the reference signal B+, the output signals of the comparator 132 maintains the previous state, so that the low voltage signal will be outputted from the other output terminal (A=B), and the high voltage signal will be outputted from the output terminal (A<B). Thereafter, the low voltage signal outputted from the other output terminal (A=B) is inverted by the inverter 133 into a high voltage signal which is in turn applied to the input terminal of the OR gate 134. Accordingly, the OR gate 134 outputs a high voltage signal at its output terminal, and the OR gate 135 also outputs a high voltage signal, so that the AND gate 136 continuously outputs a high voltage signal, resulting in maintaining the counted value from the up/down counter 141 at "0".

On the other hand, when the threshold value is "3", and the counted value from the up/down counter 141 is below "3", the comparator 143 enters an enable state. Accordingly, the comparator 143 outputs a high voltage signal at its output terminal (A<B), and a low voltage signal at its output terminal (A≧B), also the flip-flop 145, to which the high voltage signal outputted at the output terminal (A<B) is applied as a clock signal, outputs a low voltage signal of the write control signal. The H-RLSA memory 120 enters the write state by the low voltage write control signal, simultaneously the buffer 131 is turned on, so that a low voltage data is applied to the H-RLSA memory 120. At this time, the comparator 132 enters a disable state, resulting in maintaining its previous output state, and then the latch 151 enters an enable state, the subtracter 152 also enters an enable state. Accordingly, the address signal value outputted from the address generating counter 110 is latched by the latch 151, thereafter the latched value from the latch 151 and the counted value from the up/down counter 141 are subtracted by the subtracter 152. The subtracted value from the subtracter 152 is applied to the address generating counter 110 as a load signal, also in initial output state of the low voltage signal from the flip-flop 145, the low voltage pulse signal from the mono-multivibrator 153 is applied to the address generating counter 110 as a load control signal, thus the load signal from the subtracter 152 is loaded into the address generating counter 110, thereafter outputted from the address generating counter 110 in response to the system clock signal $\phi_1$ in order to address the locations of the H-RLSA memory 120. The addressed location of the H-RLSA memory 120 is a first addressed location of high voltage, so that the data of low voltage from the buffer 131 is written into.

At this time, the up/down counter 141 enters a down-count state by the low voltage signal which is previously outputted from the flip-flop 145, and in turn applied to an input terminal of the OR gate 135. Also, the system clock signal $\phi_1$ is applied as a count clock signal to the up/down counter 141 by way of the OR gate 135 and the AND gate 136. Therefore, the up/down counter 141 counts down the system clock signal $\phi_1$ in order to decrement the counted value.

Thereafter, when the system clock signal $\phi_1$ is again applied to the address generating counter 110 which counts the system clock signal $\phi_1$, and then addresses the second location of the H-RLSA memory 120. Therefore, a low voltage data can be written into the addressed location of the H-RLSA memory 120, also the up/down counter 141 can count down.

Consequently, when the counted value from the up/down counter 141 is "0", the up/down counter 141 can output a high voltage carry signal which is in turn inverted, by the inverter 144, into a low voltage signal in order to present the flip-flop 145. Thereafter, the flip-flop 145 can output a high voltage read signal in order that the read operation can be again carried out.

Thus, the horizontal-run length smoothing algorithm process is carried out by sequentially reading out the data in the location of the H-RLSA memory 120 corresponding to the each of addresses incremented by "1" at a time, and the maintaining the data when the data is a low voltage data or a high voltage data of a times succeeded above a predetermined number of times of the threshold value from the threshold setting unit 142, and writing the data, after inverting the data into a low voltage data, into the H-RLSA memory 120 when the data is a high voltage data of a times succeeded below a predetermined number of times of the threshold value from the threshold setting unit 142.

On the other hand, at initial vertical-run length smoothing algorithm process, the reset pulse signal (RST) of low voltage is applied to the AND gate 265 shown in FIG. 2, therefore the AND gate 265 outputs a low voltage signal in order to present the flip-flop 268, the flip-flop 268 can thus output a high voltage read control signal. Consequently, by the high voltage read control signal, the V-RLSA memory 240 enters a read state, simultaneously the buffer 251 enters a cut off state, also the comparator 252 enters an enable state. At this time, the selector 254 selects and outputs an output signal, also the up/down counter 261 functions as an up counter.

Also, the number of pixels to be horizontally accessed by the horizontal control signal $IO_1$ are latched by the latch 211, and then outputted from the latch 211. Furthermore, the start address signal by the start control signal $IO_2$ is loaded into the up counter 212, and then outputted from the up counter 212. The number of pixels to be vertically accessed by the vertical control signal $IO_3$ of low voltage pulse are also latched by the latch 213, and then outputted from the latch 213.

When the vertical control signal $IO_3$ of low voltage pulse is applied to the AND gate 216, the AND gate 216 outputs a low voltage pulse signal which is in turn applied to the down counter 215 as a load control signal. Therefore, the number of vertically directed pixels outputted from the latch 213 are loaded into the down counter 215, also a low voltage pulse signal outputted from the AND gate 216 is applied to the buffer 214 as a output enable signal. Thus the start address signal outputted from the up counter 212 is applied to the address generating counter 230 by way of the buffer 214, simultaneously the low voltage pulse signal outputted from the AND gate 216 is applied to the buffer 278 by way of the OR gate 277 after being inverted into a high voltage signal by the inverter 275. Therefore, the buffer 278 enters an output disable state, and the buffer 279 also enters an output disable state because the mono-multivibrator 274 outputs a high voltage signal.

Also, the vertical control signal $IO_3$ of low voltage pulse is applied to the flip-flop 223 as a clock signal, so that the flip-flop 223 outputs a high voltage signal which is in turn applied to an input terminal of the AND gate 225. Simultaneously, the reference clock signal O is supplied as a system clock signal $O_1$ by way of the AND gate 225. Therefore, the start address signal outputted from the buffer 214 is loaded into the address generating counter 230 during low voltage period, and then outputted from the address generating counter 230 in order to address the location of the V-RLSA memory 240 corresponding to the start address.

If the start address loaded into the up counter 212 is set as "1", the location of the V-RLSA memory 240 corresponding to the start address "1" is addressed, therefore the data stored in the location corresponding to the start address "1" will be read out. Also, in this case, the other conditions are supposed to be set as the pixel data of the V-RLSA memory 240 is as indicated in FIG. 3A, and the map of the V-RLSA memory 240 is as indicated in FIG. 4, also the offset value of the number of horizontal pixels latched by the latch 211 is "8", furthermore the number of the vertical pixels latched by the latch 213 is "9".

Therefore, the data read out at the location corresponding to the start address "1" will be the same high voltage data as that of the reference signal B+, so that the comparator 252 outputs a high voltage signal at its output terminal (A=B), and a low voltage signal at the other output terminal (A<B). Also, the high voltage signal outputted from the terminal (A=B) is applied to the input terminal of the AND gate 253 in order that the system clock signal $O_1$ is applied to the input terminal of the selector 254 through the AND gate 253. At this time, the selector 254 selects the input terminal (A) for inputting the system clock signal $\phi_1$ applied to tile input terminal (A) is applied to the up/down counter 261 as a count clock signal. Therefore, the up/down counter 261 counts up the system clock signal $\phi_1$, and then the counted value "1" can be obtained.

Also, the high voltage signal outputted from the flip-flop 268 is applied to an input terminal of the AND gate 218, so that the system clock signal $\phi_1$ is applied to the down counter 215 through the AND gate 218 as a count clock signal, and the counted value by the down counter 215 is "8".

Also, the start address value "1" outputted from the address generating counter 230 is added, by the adder 271, to the offset value "8" of the latch 211 in order to be the added value "9", and in turn applied to the buffer 278 which thereafter enters an output enable state resulting from outputting the low voltage signal from the OR gate 277 during the low voltage period of the system clock signal $\phi_1$. The output signal "9" from the adder 271 is loaded into the address generating counter 230 through the buffer 278, and the loaded signal then addresses the location of the V-RLSA memory 240 corresponding to the address "9" which is the second address of the first column of the V-RLSA memory 240. Therefore, the data stored In the address "9" is read out. At this time, if the data is high voltage data as indicated in FIG. 3A, the comparator 252 outputs a high voltage signal at its output terminal (A=B), and a low voltage signal at its other output terminal (A<B). Therefore, as above described, the counted value by the up/down counter 261 which counts up the system clock signal $\phi_1$ will be "2". Also, the counted value by the down counter 215 which counts down the system clock signal $\phi_1$ will be "7".

As above described, the address "9" outputted from the address generating counter 230 is address, by the adder 171, to the offset value "8" of the latch 271 in order to be the added value "17", in turn loaded into the address generating counter 230 through the buffer 278. Thereafter, the loaded signal addresses the location of the V-RLSA memory 240 corresponding to the address "17" which is the third address of the first column of the V-RLSA memory 240. Thus the data stored in the location of the V-RLSA memory 240 corresponding to the address "17" is read out. At this time if the data is a low voltage as indicated in FIG. 3A, the data is different from the reference signal B+. Therefore, the output signals from the comparator 252 are inverted, so that the low voltage signal is outputted at the output terminal (A=B), and the high voltage signal is outputted at the other output terminal (A<B). Thus, the system clock signal $\phi_1$ can not pass through the AND gate 253, so that the counted value by the up/down counter 261 will be maintained at the value "2" because the system clock signal can not be applied to the up/down counter 261. Also, at initial output state of the high voltage signal from the other output terminal (A<B) of the comparator 252, the multivibrator 255 outputs a low voltage pulse signal, resulting In a low voltage pulse signal output from the AND gate 262. The low voltage pulse signal from the AND gate 262 is in turn applied to the comparator 263 as a comparison enable signal. Therefore, the comparator 263 enters an enable state, so that the counted value from the up/down counter 261 is compared with the vertical threshold value from the threshold setting unit 264. At this time, if the counted value from the up/down counter 261 exceeds the threshold value from the threshold setting unit 264, the comparator 263 will output a high voltage signal at its output terminal (A≧B), and a low voltage signal at its other output terminal (A<B). Also, if the counted value from the up/down counter 261 is below the threshold value from the threshold setting unit 264, the comparator 263 will output a high voltage signal at the other output terminal (A<B), and a low voltage signal at the output terminal (A≧B).

For example, if the threshold value from the threshold setting unit 264 is "3", and the counted value from the up/down counter 261 is "2", the comparator 263 will output a high voltage signal at the other output terminal (A<B), and a low voltage signal at the output terminal (A≧B). The high voltage signal outputted from the other output terminal (A<B) of the comparator 263 is applied to the flip-flop 268 as a clock signal, so that the flip-flop 268 outputs a write control signal of low voltage by which the system clock signal $\phi_1$ can not pass through the AND gate 218. Therefore the system clock signal $\phi_1$ can not be applied to the down counter 215, simultaneously the V-RLSA memory 240 enters a write state by the low voltage signal, and the buffer enters an enable state. Thus the low voltage signal is applied to the V-RLSA memory 240, and the comparator 252 enters a disable state, also the selector 254 selects and outputs the system clock signal $\phi_1$ which is previously applied to the Input terminal (B) thereof. At this time, the up/down counter 261 functions as a down counter.

At initial state of the period that a low voltage signal is outputted from the flip-flop 268, the mono-multivibrator 274 also outputs a low voltage signal by which the buffer 279 enters its output enable state, thereby causing the output signal from the subtracter 273 to be applied to the address generating counter 261. At this time, the multiplier 272 multiplies the counted value "2" from the up/down counter 261 by the offset value "8" from the latch 211 to obtain the product "16" which in turn is subtracted from the address value "17" of the address generating counter 230 by the subtracter 273. As a result, the subtracter 273 outputs a "1" value signal. At this time, the low voltage pulse signal outputted from the mono-multivibrator 274 is inverted into a high voltage signal by the inverter 276. This high voltage signal is applied via the OR gate 277 to the buffer 273, thereby causing the buffer 273 to enter its output disenable state. Accordingly, "1" value output signal from the subtracter 273 is loaded into the address generating counted 230 via the buffer 279, so that the location of the V-RLSA memory 240 corresponding to the address "1" which is the start address of the V-RLSA memory 240 is addressed. Then, the low voltage signal outputted from the buffer 251 is written into the location corresponding to the address "1".

On the other hand, the system clock signal $\phi_1$ is applied via the selector 254 to the up/down counter 261 which in turn counts down said signal, so that the counted value "1" can be obtained.

Thereafter, a "9" value signal outputted from the address 217 is loaded into the address generating counter 230 via the buffer 278, so that the location of the V-RLSA memory 240 corresponding to address "9" which is the second address of the first column of the V-RLSA memory 240 is addressed. As a result, a low voltage signal is written into the location corresponding to the address "9".

At this time, the up/down counter 261 counts down again the system clock signal $\phi_1$ as mentioned above, thereby the counted value thereof to be "0" and a low voltage carry signal to be outputted. By the low voltage signal, the AND gate 267 outputs a low voltage signal which clears the up/down counter 261. Also, the AND gate 265 outputs a low voltage signal which presets the flip-flop 268. As a result, the flip-flop 268 outputs a high voltage signal as a read control signal. Thus, a read operation will be carried out, as mentioned above.

That is, locations of the V-RLSA memory 240 are sequentially addressed. The addressing starts at the location corresponding to the address "17". Data read out from the addressed locations is at low voltage state, as shown in the table of FIG. 3A, so that the output signal from the comparator 252 is maintained at the previous state in which low voltage signal is outputted from the output terminal (A=B) and high voltage signal is outputted from the output terminal (A<B). As a result, no system clock signal $\phi_1$ is applied to the up/down counter 261, thereby causing the up/down counter 261 to maintain the counted value "0". At this time, the system clock signal $\phi_1$ is applied via the AND gate 218 to the down counter 215 which in turn counts down said signal $\phi_1$, thereby causing the counted value thereof to be "6".

When data read out from the sequentially-addressed locations of the first column of the V-RLSA memory 240 is maintained at low voltage state, the up/down counter 261 maintains continuously the counted value "0" and the down counter 215 counts down by "1" at a time.

On the other hand, when data read out from the sequentially-addressed locations of the first column of the V-RLSA memory 240 is maintained at high voltage state, output signal from the comparator 252 is inverted. Thereby, the comparator 252 is maintained at a state that the output terminal (A=B) thereof to output a high voltage signal and the output terminal (A<B) thereof to output a low voltage signal. As a result, system clock signal $\phi_1$ is applied to the up/down counter 261, thereby the up/down counter 216 to count up from "0", by "1" at a time and the down counter 215 to count down by "1" at a time.

After data has been read out from all (that is, "9") locations corresponding to addresses of the first column of the V-RLSA 240, the counted value from the down counter 215 is "0", thereby causing the down counter 215 to output a low voltage carry signal. By this low voltage signal, the AND gate 262 output a low voltage signal which enables the comparator 263. As a result, the comparator 263 compares the counted value from the up/down counter 261 with the vertical threshold value from the threshold setting unit 264. At this time, when the counted value from the up/down counter 261 is "4" as high voltage state of data is continued 4 times, as shown in the table of FIG. 3A, the comparator 263 outputs a low voltage signal at the output terminal (A<B) thereof and a high voltage signal at the output terminal (A≧B) thereof. At initial state of the period that this high voltage signal is outputted, the mono-multivibrator 266 outputs a low voltage pulse signal, thereby causing the AND gate 267 to output a low voltage signal which clears the up/down counter 261.

The low voltage carry signal outputted from the down counter 215 is also applied as a clock signal to the up counter 212, thereby causing the counted value from the up counter 212 to be incremented by "1". That is, the output signal from the up counter 212 has "2" value. The low voltage carry signal is also applied via the buffer 217 to the AND gate 216, thereby causing the AND gate 216 to output a low voltage signal. As a result, "9" value, the number of vertical pixels latched by the latch 213 is loaded into the down counter 215, on the other hand, "2" value of the output signal from the up counter 212 is loaded into the address generating counter 230 via the buffer 214, so that the location of the V-RLSA memory 240 corresponding to address "2" which is the first address of the second column of the V-RLSA memory 240 is addressed. Subsequent operations are carried out in the same manner as mentioned above.

On the other hand, the low voltage carry signal outputted from the down counter 215 is also applied as a clock signal to the up counter 224 which in turn counts up said clock signal. The counted value from the up counter 224 is compared with "8" value, the offset value from the latch 211, by the comparator 221. When the counted value from the up counter 224 is "8" value as processing for all columns of the V-RLSA 240 has been carried out, the comparator 221 outputs a high voltage signal at the output terminal (A=B) thereof. At initial state of the period that this high voltage signal is outputted, the mono-multivibrator 222 outputs a low voltage pulse signal which is in turn applied as clock signal to the flip-flop 223. As a result, the flip-flop 223 outputs low voltage signal which is in turn applied to one input terminal of the AND gate 225, so that reference clock signal $\phi$ can not pass through the AND gate 225, thereby causing the AND gate 225 to input no system clock signal $\phi_1$. Thus, the above operation will be finished.

As apparent from the flowchart of FIG. 5, pixel data is read out from the addressed locations of the V-RLSA memory 240, in order to determine its voltage state. When pixel data is at high voltage state, the counted value from the up/down counter 261 is Incremented by "1". Then, a location corresponding to the value obtained by adding the offset value from the latch 211 to the current address value is addressed, so that next pixel data is read out. If this pixel data is at low voltage and the previous pixel data is also at low voltage, next pixel data is read out, under the condition that the counted value of the up/down counter 261 maintains "0" value. On the other hand, when only the previous pixel data is at high voltage, the counted value from the up/down counter 261 is compared with the vertical threshold value from the threshold setting unit 264. If the counted value from the up/down counter 261 is not less than the vertical threshold value, next pixel data is read out, under the condition that the counted value from the up/down counter 261 maintains "0" value. If the counted value from the up/down counter 261 is less than the vertical threshold value, the counted value from the up/down counter 261 is multiplied by the offset value from the latch 211. Then, the product is subtracted from the current address value, so that a location of the V-RLSA memory 240 corresponding to the obtained value is addressed. After pixel data read out from the location is maintained at low voltage state, the counted value of the up/down counter 261 is decremented by "1". Then, when the counted value from the up/down counter 261 is not "0", the offset value from the latch 211 is added to the current address value, so that next location of the V-RLSA memory 240 corresponding to the obtained value is addressed. Thereafter, subsequent operations for maintaining pixel data at low voltage state are repeatedly carried out. When the counted value from the up/down counter 261 is "0", next location of the V-RLSA memory 240 is addressed and next pixel is read out from said addressed location, as mentioned above.

By the above operations, vertical pixel data shown in FIG. 3A is smoothed as shown in FIG. 3B.

On the other hand, logical combination of pixel data processed by vertical/horizontal-run length smoothing algorithm processes is carried out by a circuit shown in FIG. 6.

During the period that a horizontal-run length smoothing algorithm process is carried out by the H-RLSA circuit 100, the V-RLSA circuit 200 does not output a low voltage end signal ES, that is, outputs a high voltage signal. As a result, the OR gate 311 outputs continuously high voltage signal, irrespective of reference clock signal $\phi$, thereby causing the flip-flop 312 to output no system clock signal $\phi_1$.

By the high voltage signal, each of selectors 322 to 325 selects a signal which is inputted to its input terminal A and in turn outputs it.

Accordingly, address signal outputted from the H-RLSA circuit 100 is applied via the selector 322 to the H-RLSA memory 120, so that a location of the H-RLSA memory 120 corresponding to the address signal is addressed. On the other hand, read/write control signals R/W outputted from the H-RLSA circuit 100 are applied via the selector 324 to the H-RLSA memory 120, thereby causing read and write operations of the H-RLSA memory 120 to be controlled.

During the period that a vertical-run length smoothing algorithm process is carried out by the V-RLSA circuit 200, address signal outputted from the V-RLSA circuit 200 is applied via the selector 323 to the V-RLSA memory 240, so that a location of the V-RLSA memory 240 corresponding to the address signal is addressed. Also, read/write control signals R/W outputted from the V-RLSA circuit 200 are applied via the selector 325 to the V-RLSA memory 240, thereby causing read and write operations of the V-RLSA memory 240 to be controlled.

On the other hand, when the vertical-run length smoothing algorithm process is completed, the V-RLSA circuit 200 outputs low voltage end signal ES. This low voltage end signal ES is applied to one input terminal of the OR gate 311, so that reference clock signal O is applied via the OR gate 311 to the flip-flop 312 as a clock signal. As a result, the flip-flop 312 outputs system clock signal $O_1$ which is in turn applied to the down dounter 314 and the up counter 313 as a count clock signal. The system clock signal $O_1$ is also applied to the input terminal (B) of the selector 324 and the output enable terminal (OE) of the buffer 340.

By the low voltage end signal ES, each of selectors 322 to 325 selects a signal which is inputted to its input terminal B and outputs it. The low voltage end signal ES is inverted into a high voltage signal and in turn applied to the input terminal (B) of the selector 324. Accordingly, the up counter 313 counts system clock signal $\phi_1$ as shown in FIG. 7B and outputs the counted signal to the H-RLSA memory 120 and the V-RLSA memory 240 via the selectors 322 and 323, respectively. As a result, locations of the H-RLSA memory 120 and the V-RLSA memory 240 corresponding to the counted value are sequentially addressed. At this time, the system clock signal $\phi_1$ is applied via the selector 324 to read/write control signals as shown in FIG. 7C, thereby causing the H-RLSA memory 120 to be at its read state during the high voltage period of the system clock signal $\phi_1$ and at its write state during the low voltage period of the system clock signal $\phi_1$. On the other hand, the high voltage signal applied to the input terminal (B) of the selector 325 is applied to the V-RLSA memory 240 as a read control signal, as shown in FIG. 7D, thereby causing the V-RLSA memory 240 to be maintained at its read state.

As locations of the H-RLSA memory 120 and the V-RLSA memory 240 corresponding to the same counted value of the up counter 313 are addressed as stated above, the data of the addressed location of the H-RLSA memory 120 is read out during the high voltage period of the system clock signal $\phi_1$ and the data of the addressed location of the V-RLSA memory 240 is directly read out, such data which are read out from the addressed locations of the H-RLSA memory 120 and the V-RLSA memory 240 corresponding to the same counting value are ANDed by bit unit at the AND gate 330 and are applied to the buffer 340.

On the other hand, the system clock signal $\phi_1$ is applied to the buffer 340 as output enable control signal shown in FIG. 7E, sequentially as the buffer 340 enters the output enable state during the low voltage period of the system clock signal $\phi_1$, thus the data which is inputted into the buffer 340 is outputted as shown in FIG. 7F. At this time, as the H-RLSA memory 120 enters write state when the system clock signal $\phi_1$ is low voltage signal, the data which is outputted from the buffer 340 is written into the addressed location of the H-RLSA memory 120. Namely, the pixel data of the H-RLSA memory 120 shown in FIG. 8A and the pixel data of the V-RLSA memory 240 shown in FIG. 8B are ANDed and written into the H-RLSA memory 120 as shown in FIG. 8C. On the other hand, the down counter 314 counts down the system clock signal $\phi_1$, accordingly when the system clock signal $\phi_1$ of the predetermined number of times which is required to complete the performance of the above ANDed combination is outputted, the low voltage carry signal is outputted from the down counter 314 to clear the flip-flop 312, and then no system clock signal $\phi_1$ is outputted, thereby the above operation can be completed.

As previously stated above, in accordance with the present invention, the horizontal/vertical-run length smoothing algorithm processes are performed directly by a hardware not by a microprocessor's program, and the data which is performed by the horizontal/vertical-run length smoothing algorithm processes is logical-program. Therefore, the document acknowledge system of the present invention performs tasks much faster than the prior arts do and increases the using efficiency of microprocessors by reducing tasks thereof.

While preferred embodiments of the present invention have been illustrated, it will be understood that those are by way of illustration only, and that various changes and modifications may be made within the contemplation of the invention and within the scope of the claims.

What is claimed is:

1. A scanning filtering system comprising:
   determining means for determining a pixel value;
   storing means for storing the pixel value;
   register means for storing a count, the count being incremented when the pixel value is within a predetermined range;
   resetting means for resetting the count in the register means when a current pixel value is outside the predetermined range;

comparing means for comparing the count to a predetermined number; and changing means for changing the values of a variable number of stored pixel values, when the count is less than the predetermined number, the variable number being equal to the current count.

2. The scanning filtering system of claim 1, wherein, the resetting means resets the count when a prior pixel value is outside the predetermined range.

3. The scanning filtering system of claim 1, wherein, the resetting means resets the count when a prior pixel value is within the predetermined range and the count is greater or equal to the predetermined number.

4. The scanning filtering system of claim 1, wherein the determining means repetitively determines pixel values of pixels scanned in a horizontal row.

5. The scanning filtering system of claim 1, wherein the determining means repetitively determines pixel values of pixels scanned in a vertical row.

6. The scanning filtering system of claim 1, wherein the determining means determines pixel values of pixels repetitively scanned in horizontal rows and repetitively scanned in vertical rows.

7. The scanning filtering system of claim 6, further including means for performing a logical AND operation of stored pixel values derived from scanning in horizontal rows and stored pixel values derived from scanning in vertical rows.

8. The scanning filtering system of claim 1, further including an address pointer wherein said storing means is responsive to said address pointer and said changing means alters said address pointer by the product of said variable number and an offset.

9. The scanning filtering system of claim 8, wherein said changing means, after altering said address pointer, increments said address pointer by said offset a variable number of times.

10. The scanning filtering system of claim 8, wherein the changing means decrements said count a variable number of times.

11. The scanning filtering system of claim 9, wherein the changing means decrements said count a variable number of times.

12. A scanning filtering method comprising the steps of:

determining a pixel value;

storing the pixel value;

storing a count in a register, the count being incremented when the pixel value is within a predetermined range;

resetting the count in the register when a current pixel value is outside the predetermined range;

comparing the count to a predetermined number;

changing the values of a variable number of stored pixel values, when the count is less than the predetermined number, the variable number being equal to the current count.

13. The scanning filtering of claim 12, further comprising:

resetting the count when a prior pixel value is outside the predetermined range.

14. The scanning filtering method of claim 12, further comprising:

resetting the count when a prior pixel value is within the predetermined range and the count is greater or equal to the predetermined number.

15. The scanning filtering method of claim 12, wherein the determining step includes repetitively determining pixel values of pixels scanned in a horizontal row.

16. The scanning filtering method of claim 12, wherein the determining step includes repetitively determining pixel values of pixels scanned in a vertical row.

17. The scanning filtering method of claim 12, wherein the determining step includes determining pixel values of pixels repetitively scanned in horizontal rows and repetitively scanned in vertical rows.

18. The scanning filtering method of claim 17 further comprising performing a logical AND operation of stored pixel values derived from scanning in horizontal rows and stored in pixel values derived from scanning in vertical rows.

19. The scanning filtering of claim 12, wherein the step of storing a pixel value is responsive to an address pointer and the step of changing includes altering said address pointer by the product of said variable number and an offset.

20. The scanning filtering method of claim 19, wherein the step of changing further includes incrementing said address pointer by said offset a variable number of times.

21. The scanning filtering method of claim 19 wherein the steps of changing further includes decrementing said count a variable number of times.

22. The scanning filtering method of claim 20 wherein the step of changing further includes decrementing said count a variable number of times.

* * * * *